(12) United States Patent
Vaziri

(10) Patent No.: US 11,308,591 B1
(45) Date of Patent: Apr. 19, 2022

(54) METHOD AND APPARATUS FOR A SOFTWARE ENABLED HIGH RESOLUTION ULTRASOUND IMAGING DEVICE

(71) Applicant: Masoud Vaziri, Richardson, TX (US)

(72) Inventor: Masoud Vaziri, Richardson, TX (US)

( * ) Notice: Subject to any disclaimer, the term of this patent is extended or adjusted under 35 U.S.C. 154(b) by 152 days.

(21) Appl. No.: 16/507,910

(22) Filed: Jul. 10, 2019

Related U.S. Application Data

(60) Provisional application No. 62/696,346, filed on Jul. 11, 2018.

(51) Int. Cl.
| | |
|---|---|
| *G06T 5/00* | (2006.01) |
| *G06T 5/50* | (2006.01) |
| *G06T 7/00* | (2017.01) |
| *G06K 9/62* | (2022.01) |

(52) U.S. Cl.
CPC .............. *G06T 5/50* (2013.01); *G06K 9/6289* (2013.01); *G06T 7/0012* (2013.01); *G06T 2207/10088* (2013.01); *G06T 2207/10136* (2013.01)

(58) Field of Classification Search
CPC ................. G06T 5/50; G06T 7/0012; G06T 2207/10136; G06T 2207/10088; G06K 9/6289

See application file for complete search history.

(56) References Cited

U.S. PATENT DOCUMENTS

| | | | |
|---|---|---|---|
| 2010/0290685 A1* | 11/2010 | Wein ..................... | G06T 7/33 382/131 |
| 2015/0209002 A1* | 7/2015 | De Beni .............. | A61B 8/5261 600/411 |
| 2017/0360578 A1* | 12/2017 | Shin ....................... | B33Y 50/00 |
| 2018/0330473 A1* | 11/2018 | Foi ........................ | G06T 7/337 |
| 2019/0175214 A1* | 6/2019 | Wood ................... | A61B 8/4209 |

OTHER PUBLICATIONS

Lees et al. (Ultrasound Imaging in Three and Four Dimensions, Seminars in Ultrasound, CT, and MR/, vol. 22, No. 1 (Feb. 2001),: pp. 85-105, (Year: 2001).*

* cited by examiner

*Primary Examiner* — Frank F Huang

(57) ABSTRACT

Various computational methods and techniques are presented to increase the lateral and axial resolution of an ultrasound imager in order to allow a medical practitioner to use an ultrasound imager in real time to obtain a 3D map of a portion of a body.

10 Claims, No Drawings

METHOD AND APPARATUS FOR A SOFTWARE ENABLED HIGH RESOLUTION ULTRASOUND IMAGING DEVICE

CROSS-REFERENCE TO RELATED APPLICATIONS

This patent application claims the benefits of U.S. Provisional Application No. 62/696,346, filed Jul. 11, 2018, and entitled "METHOD AND APPARATUS FOR A SOFTWARE ENABLED HIGH RESOLUTION ULTRASOUND IMAGING DEVICE" which is incorporated by reference herein.

TECHNICAL FIELD

Embodiments of this invention relate to devices and methods for enhancing images captured by an ultrasound imaging device. In particular, the resolution of a low resolution image of an object captured by an ultrasound imaging device is improved via at least one higher resolution image taken of at least a portion of the same or a similar object.

BACKGROUND

MRI and ultrasound imagers are two of the main medical imaging devices that are used to see inside a living organism non-intrusively. Current MRI systems are huge, bulky, slow and expensive. Additionally, they can't be used for real time applications by medical practitioners. A physical therapist, for example, needs to know how the tissues, ligaments or muscles respond to various exercises or stretches or how much they have healed or improved. Also medical practitioners often need to assess the impact of extra force when for example they stretch a muscle. They also need to know the nature of an obstacle when stretching leads to pain or it is not possible beyond a limit, as a result of an injury. Is there a piece of broken bone or a detached ligament? Currently, physical therapists can't see inside an organ or a body part that they interact with. Instead, they try to infer, sense, or gauge the body's reaction in order to decide about the best course of action. If they could see the inside before and after an exercise or in real time, they could make better and faster decisions which could lead to shorter recovery time for patients and lower cost for health care providers. In other words, it will be hugely beneficial to both patients and care providers to have a real time or even near real time high resolution images of an area of interest. Ultrasound imagers are much smaller and less expensive than MRI machines and they can provide real time images. However, the images from ultrasound imagers are noisy and have much less image resolution (details) than MRI images.

SUMMARY

MRI machines can generate high resolution images of a portion of a living organism but they are big, bulky and expensive. Additionally, it takes days to get the results back. Ultrasound imagers are compact and low cost and can generate images in real time. An object of this invention is to improve the resolution of the ultrasound imagers using computational techniques so that ultrasound imagers are used more often by medical practitioners. This will reduce the healthcare cost and make it possible for more medical facilities to have accurate imaging devices.

DETAILS OF THE SOLUTIONS

To improve the resolution and to lower the noise in ultrasound imagers, in this disclosure, many imaging systems and configurations are presented. Each solution has its own advantages and may be the best depending on the circumstance.

In the first imaging system, high resolution images from a volume of interest or a portion of a body is captured using an MRI machine. These images are high resolution 2D slices of a volume or a portion of a body and they are fused together to create a high-resolution 3D map of the volume of interest. These MRI images and the constructed 3D map are stored in a database and at least one slice of the 3-D map is used as a training image or a high resolution reference image to increase the resolution of a corresponding ultrasound image.

When an ultrasound image is captured, the relative location of the imager's head with respect to the body part is used to generate a corresponding 2D slice from the 3D map of the body part. A pattern recognition algorithm can be used to find a slice from the 3D map that best matches the ultrasound image. At this stage, we will have two images: a low resolution from the ultrasound imager and a high resolution image generated from the 3D map. Next a bandwidth extrapolation technique is used to enhance the ultrasound image using high resolution image in an iterative fashion. The ultrasound imager will be equipped with a 9-axis accelerometer in order to relate various ultrasound images to each other. These ultrasound images can also be combined to create a new 3D map of the body part or volume of interest. The advantage is that this later 3D map can be created very quickly. It is also possible to feed the MRI images to a computer that controls the ultrasound imager. A medical practitioner will select an slice of interest from the 3D MRI map and requests for a corresponding slice using the ultrasound imager. The starting point (location) of the ultrasound imager is decided by the medical practitioner and the ultrasound imager uses the 9-axes accelerometer to fine tune its position before capturing an image and displaying it on a screen.

The second approach is to use multi ultrasound imagers, similar to multi-camera imaging approach disclosed in the U.S. patent application Ser. No. 15/400,399. The depth of view of an ultrasound imager is inversely proportional with the frequency of the ultrasound waves used by the ultrasound machine. An ultrasound imager with higher frequency penetrates less in the body but it creates an image that its axial resolution is higher than another ultrasound imager with a lower frequency. Lateral resolution is a function of the beam angle. A wider beam angle (larger field of view) results in a lower lateral resolution than a narrower angle beam (smaller field of view). As already disclosed in the U.S. patent application Ser. No. 15/400,399, one can fuse (combine) a low resolution image and a higher resolution image that at least partially overlap to generate a higher resolution version of the low resolution image. In doing so, a high resolution image of a slice of an organ or part of a body is obtained. By combining many of such slices, a high resolution 3D map of the volume is obtained without a need for an MRI machine.

Another method to improve the resolution of an ultrasound imager is to use publicly available images as reference. A medical practitioner will interact with a computer program installed on a computer to select a part of a body from a menu and also select a region of interest from a map provided via the menu on a display. Once a part of a body is selected, the program on the computer will access the general description and features of the part or parts. The user can additionally input what areas within the part of the body might have been damaged. These suspected damaged areas will be enhanced once the image resolution of the surrounding healthy areas is improved. With these inputs, the program will have an estimate of how an image may look like and where the soft and hard tissues might be at. The program will use the reflectivity and the shapes of various parts within the area of interest as well. This in effect allows creating a smart ultrasound imager that uses some prior knowledge before creating an image. Presently, an ultrasound imager only creates an output image and it's the task of a practitioner to use her own knowledge to evaluate an ultrasound image. By applying rules, restrictions and a number of other known information about an area or volume of interest, a high resolution image of at least one cross section of the volume of interest is created and portions of the image that does not follow the general rules or lack the expected properties are marked. This makes the task of a medical practitioner much easier while providing images with a higher resolution and quality than a standard ultrasound imager. This method is in effect an application of machine learning and artificial intelligence to ultrasound imaging.

For certain areas of an ultrasound image, a training image or a property of an organ or a tissue is used or taken into account to remove the noise or increase the resolution of the ultrasound image. A training image may be an image from an MRI machine or from a public database. Rules are extracted from a database of similar images using artificial intelligence. An artificial intelligent program looks for common features in a volume or in a plane or in a slice or cross-section of the volume. For example, when a torn ligament is studied, high resolution images of the surrounding bones and other tissues can be used to let the imager know how the healthy area surrounding the ligament look like. The healthy area image portion will be used to enhance the image of the area in question. As a result, the image of the torn ligament can be significantly enhanced and its resolution can be increased.

Another method to obtain higher resolution images from an ultrasound imager is to use a technique similar to multi-frame sub-pixel super-resolution technique. In this method, the lateral resolution of an ultrasound imager is improved by shifting the imaging head in small increments and taking an image at each step. An actuator is used to move the imaging head and an accelerometer is used to measure and control the shifts accurately. The location of the imager with respect to the body part is monitored and recorded for each recorded image frame and several images are taken in succession with lateral shifts with respect to each other. The captured several images are mapped into a higher resolution grid and image registration is used to properly align the images and combine them to create a higher resolution image.

Resolution of an ultrasound imager is determined by its frequency. Larger frequencies result in higher resolution images. However, higher frequencies penetrate less in a tissue. We suggest combining two ultrasound images captured via a low frequency and high frequency ultrasound imager to create a high resolution ultrasound image with sufficient penetration depth through a tissue. Only one imager will be active at a time and the two images will take pictures alternatively and provide captured images to a processor. The processor will use those images to generate at least a single high resolution image. In fact, by using a range of ultrasound frequencies, we can obtain a number of images with different resolutions and depths. Such multi-resolution images when combined properly with a band-width extrapolation technique could result in a single high resolution image with sufficient depth and lateral and axial resolution.

In some applications, to shorten the time required for image capturing, an imaging head is used that is deformable to easily match the contour of a portion of a body. The imaging head will include many imaging blocks. Depending on the resultant contour, at least one imaging block is fired up and the remaining blocks are used to record the reflected and scattered ultrasound waves sent by the at least one block. The information from all the capturing blocks is used to create a single image of a cross-section or slice of a portion of a body.

I claim:

1. An imaging method for monitoring healing of an injury of a portion of a human body comprising:

acquiring, via an ultrasound imager, at least one first image corresponding to at least one first slice of a first volume of the portion of the human body wherein the first volume includes a healthy volume and an injured volume, the healthy volume partially surrounds the injured volume, and the at least one first image includes at least one first subset that is associated with the healthy volume and at least one second subset that is associated with the injured volume;

receiving at least one second image corresponding to at least one second slice of a second volume of the human body wherein the at least one second image captured with an MRI machine and prior to capturing the at least one first image and the first and second volumes have an overlap and the overlap includes at least a portion of the healthy and the injured volumes; and Executing, via at least one processor, an image resolution enhancement procedure to generate, based upon the at least one first image and the at least one second image, at least one third image corresponding to a portion of the at least one second subset in such a way that the image details in the at least one third image are more clear than the image details in the corresponding subset in the at least one first image;

whereby through capturing at least one reference image with an MRI machine, a healthcare practitioner can monitor the healing of an injured portion of a human body over an extended period of time with an ultrasound imager that is much less expensive, much more compact and much easier to operate than an MRI machine and yet obtain images that in terms of resolution are comparable to the resolution of the at least one reference image.

2. The imaging method of claim 1 wherein the image resolution enhancement procedure comprises:

recognizing patterns in both the at least one first image and the at least one second image; and learning from the recognized patterns to generate the at least one third image.

3. The imaging method of claim 1 wherein the first volume is a subset of the second volume.

4. The imaging method of claim 1 wherein the image resolution enhancement procedure is an iterative image resolution enhancement procedure.

5. An imaging apparatus for monitoring healing of an injury of a portion of a human body comprising:

an ultrasound imaging unit for capturing at least one first image corresponding to at least one first slice of a first volume of the portion of the human body wherein the first volume includes a healthy volume and an injured volume, the healthy volume partially surrounds the injured volume, and the at least one first image includes at least one first subset that is associated with the healthy volume and at least one second subset that is associated with the injured volume;

a memory unit for storing at least one second image corresponding to at least one second slice of a second volume of the human body wherein the at least one second image captured with an MRI machine and prior to capturing the at least one first image and the first and second volumes have an overlap and the overlap includes at least a portion of the healthy and the injured volumes; and at least one processor, in communication with the ultrasound imaging unit and the memory unit, configured to:
execute an image resolution enhancement procedure to generate, based upon the at least one first image and the at least one second image, at least one third image corresponding to a portion of the at least one second subset in such a way that the image details in the at least one third image are more clear than the image details in the corresponding subset in the at least one first image;

whereby through capturing at least one reference image with an MRI machine, a healthcare practitioner can monitor the healing of an injured portion of a human body over an extended period of time with an ultrasound imager that is much less expensive, much more compact and much easier to operate than an MRI machine and yet obtain images that in terms of resolution are comparable to the resolution of the at least one reference image.

6. The imaging apparatus of claim 5 wherein the image resolution enhancement procedure comprises:
recognizing patterns in both the at least one first image and the at least one second image; and
learning from the recognized patterns to generate the at least one third image.

7. The imaging apparatus of claim 5 wherein the first volume is a subset of the second volume.

8. The imaging apparatus of claim 5 wherein the image resolution enhancement procedure is an iterative image resolution enhancement procedure.

9. An imaging apparatus for monitoring healing of an injury of a portion of a first human body comprising:
an ultrasound imaging unit for capturing at least one first image corresponding to at least one first slice of a first volume of the portion of the first human body wherein the first volume includes a healthy volume and an injured volume, the healthy volume partially surrounds the injured volume, and the at least one first image includes at least one first subset that is associated with the healthy volume and at least one second subset that is associated with the injured volume;

a memory unit for storing at least one second image corresponding to at least one second slice of a second volume of a second human body wherein the at least one second image captured with an MRI machine and prior to capturing the at least one first image; and at least one processor, in communication with the ultrasound imaging unit and the memory unit, configured to:
execute a learning based iterative image resolution enhancement procedure to generate, based upon the at least one first image and the at least one second image, at least one third image corresponding to a portion of the at least one second subset in such a way that the image details in the at least one third image are more clear than the image details in the corresponding subset in the at least one first image;

whereby through capturing at least one reference image with an MRI machine, a healthcare practitioner can monitor the healing of an injured portion of a human body over an extended period of time with an ultrasound imager that is much less expensive, much more compact and much easier to operate than an MRI machine and yet obtain images that in terms of resolution are comparable to the resolution of the at least one reference image.

10. The imaging apparatus of claim 9 wherein the first and the second human bodies are the same.

* * * * *